(12) United States Patent
Germain et al.

(10) Patent No.: US 12,151,680 B2
(45) Date of Patent: Nov. 26, 2024

(54) METHOD FOR CALCULATING THE LATERAL POSITION OF A MOTOR VEHICLE

(71) Applicants: RENAULT s.a.s., Boulogne-Billancourt (FR); NISSAN MOTOR CO., LTD., Yokohama (JP)

(72) Inventors: Guillaume Germain, Versailles (FR); Ludovic Bot, Rennes (FR); Raphael Quilliard, Massy (FR)

(73) Assignees: AMPERE S.A.S., Boulogne-Billancourt (FR); NISSAN MOTOR CO., LTD., Yokohama (JP)

( * ) Notice: Subject to any disclaimer, the term of this patent is extended or adjusted under 35 U.S.C. 154(b) by 416 days.

(21) Appl. No.: 17/616,390

(22) PCT Filed: Apr. 22, 2020

(86) PCT No.: PCT/EP2020/061130
§ 371 (c)(1),
(2) Date: Dec. 3, 2021

(87) PCT Pub. No.: WO2020/244841
PCT Pub. Date: Dec. 10, 2020

(65) Prior Publication Data
US 2022/0324444 A1    Oct. 13, 2022

(30) Foreign Application Priority Data

Jun. 6, 2019    (FR) ...................... 19 06049

(51) Int. Cl.
*B60W 30/12*    (2020.01)
*B60W 50/00*    (2006.01)
(Continued)

(52) U.S. Cl.
CPC ........ *B60W 30/12* (2013.01); *B60W 50/0098* (2013.01); *B60W 50/14* (2013.01);
(Continued)

(58) Field of Classification Search
None
See application file for complete search history.

(56) References Cited

U.S. PATENT DOCUMENTS

| | | |
|---|---|---|
| 2005/0228588 A1 | 10/2005 | Braeuchle et al. |
| 2016/0096546 A1 | 4/2016 | Chia |

(Continued)

FOREIGN PATENT DOCUMENTS

| | | |
|---|---|---|
| EP | 3 002 178 A1 | 4/2016 |
| JP | 2019-59451 A | 4/2019 |

OTHER PUBLICATIONS

International Search Report issued on May 8, 2020 in PCT/EP2020/061130 filed Apr. 22, 2020, 2 pages.

*Primary Examiner* — Hongye Liang
(74) *Attorney, Agent, or Firm* — Oblon, McClelland, Maier & Neustadt, L.L.P.

(57) ABSTRACT

A method for calculating a lateral position of an ego motor vehicle on a traffic lane includes calculating a first theoretical lateral position of the ego vehicle, calculating a second theoretical lateral position of the ego vehicle, calculating a third theoretical lateral position of the ego vehicle, calculating the lateral position of the ego vehicle using a weighted average of the first lateral position, the second lateral position, and the third lateral position.

11 Claims, 4 Drawing Sheets

(51) Int. Cl.
*B60W 50/14* (2020.01)
*B60W 60/00* (2020.01)

(52) U.S. Cl.
CPC . *B60W 60/0015* (2020.02); *B60W 2050/0022* (2013.01); *B60W 2540/20* (2013.01); *B60W 2552/10* (2020.02); *B60W 2552/53* (2020.02); *B60W 2554/20* (2020.02); *B60W 2554/4041* (2020.02); *B60W 2554/4042* (2020.02); *B60W 2710/20* (2013.01)

(56) References Cited

U.S. PATENT DOCUMENTS

2017/0326980 A1* 11/2017 Masui ................... B60W 30/00
2018/0065552 A1* 3/2018 Mori ....................... B60Q 9/00

* cited by examiner

METHOD FOR CALCULATING THE LATERAL POSITION OF A MOTOR VEHICLE

TECHNICAL FIELD OF THE INVENTION

The invention relates to a method for calculating the lateral position of a motor vehicle, notably an autonomous vehicle. The invention also relates to a motor vehicle, notably an autonomous vehicle, comprising means for implementing such a method for calculating the lateral position.

PRIOR ART

An autonomous vehicle is equipped with means for detecting the environment of the vehicle and with a servo steering device. Notably, the detection means are capable of identifying the traffic lane on which the vehicle is located. A computer linked to both the detection means and the steering means can control the steering device so that the vehicle remains in the center of the traffic lane. In this context, there are known lane centering assistance systems, also referred to as "Lane Centering Assist" or LCA. Such systems are, notably, the subject of specifications described in UNECE Regulation R79.

However, known lane centering assistance systems position the autonomous vehicle in a non-natural way. The lateral position of the vehicle on its traffic lane does not match that which would be adopted by a driver if he could control the steering device himself. Thus the autonomous vehicle does not merge into the traffic stream, and risks of collision with other vehicles or objects may be increased. In particular, known lane centering assistance systems do not enable the lateral safety distances from other vehicles or obstacles to be optimized. Furthermore, in a situation of congestion, known systems do not enable the vehicle to be shifted laterally to leave enough space for a motorcycle or an emergency vehicle overtaking a line of cars.

DESCRIPTION OF THE INVENTION

The aim of the invention is to provide a method for calculating the lateral position of a motor vehicle which overcomes the aforementioned drawbacks and improves the known methods of the prior art.

More precisely, a first object of the invention is a method for calculating a lateral position of the vehicle which is safe and risk-free.

A second object of the invention is a solution is a method for calculating a lateral position of the vehicle which can facilitate the travel of other road users.

SUMMARY OF THE INVENTION

The invention relates to a method of calculating a lateral position of an ego motor vehicle on a traffic lane, the method comprising:
 a first step of calculating a first theoretical lateral position of the ego vehicle on said traffic lane as a function of a lateral position on said traffic lane of vehicles preceding the ego vehicle and/or of vehicles following the ego vehicle, and/or
 a second step of calculating a second theoretical lateral position of the ego vehicle on said traffic lane as a function of the position of vehicles on the traffic lanes adjacent to said traffic lane,
 a third step of calculating a third theoretical lateral position of the ego vehicle on said traffic lane as a function of static obstacles detected on the sides of said traffic lane, and
 a fourth step of calculating the lateral position of the ego vehicle using a weighted average of the first lateral position, the second lateral position and the third lateral position.

The first calculation step may comprise a substep of calculating a weighted average of the lateral positions of vehicles preceding and/or following on said traffic lane, weighting coefficients of each lateral position being a function of the longitudinal distance between the ego vehicle and the preceding vehicle and/or the following vehicle concerned, and of the speed of the preceding vehicle and/or the following vehicle concerned.

The second calculation step may comprise:
 a substep of calculating a theoretical safety corridor on either side of a demarcation line, the demarcation line extending between the traffic lane of the ego vehicle and a traffic lane adjacent to the traffic lane of the ego vehicle,
 a substep of detecting the presence of a vehicle in the safety corridor,
 a substep of calculating the second theoretical lateral position as a function of the distance between the ego vehicle and the vehicle detected in said safety corridor and as a function of the speed of the vehicle detected in said safety corridor.

The calculation method may comprise a first condition for the execution of the calculation method, the first condition for execution being met:
 if demarcation lines of the traffic lane of the ego vehicle are detected by the ego vehicle, and
 if the curvature of the traffic lane of the ego vehicle is less than or equal to a predefined threshold.

The calculation method may comprise a second condition for the execution of the first calculation step, the second condition for execution being met:
 if at least one first vehicle preceding the ego vehicle is detected,
 if at least one second vehicle preceding or following the ego vehicle is detected, and
 if no direction indicator on the ego vehicle is activated.

The fourth calculation step may comprise:
 a substep of detecting traffic conditions of the ego vehicle, and
 a substep of calculating a weighting coefficient of the first theoretical lateral position, a weighting coefficient of the second theoretical lateral position, and a weighting coefficient of the third theoretical lateral position, as a function of the traffic conditions of the ego vehicle detected.

The fourth calculation step may comprise:
 a substep of limiting the difference between the theoretical lateral position of the ego vehicle and a theoretical midline of the traffic lane of the ego vehicle, and/or
 a substep of limiting the temporal variation of the theoretical lateral position of the ego vehicle.

The calculation method may comprise:
 a fifth step of autonomous control of a steering device of the ego vehicle to cause the ego vehicle to adopt the theoretical lateral position calculated in the fourth step,
 a sixth step of displaying on a screen of the ego vehicle a visual indication showing the position of the ego vehicle relative to a theoretical midline of the traffic lane of the ego vehicle.

The invention also relates to a computer program product comprising program code instructions, recorded on a computer-readable medium, for implementing the steps of the method as defined above when said program runs on a computer. The invention also relates to a computer program product that can be downloaded from a communication network and/or recorded on a computer-readable and/or computer-executable data medium, the computer program product comprising instructions which, when the program is executed on a computer, cause the computer to implement the method as defined above.

The invention also relates to a computer-readable data recording medium on which is recorded a computer program comprising program code instructions for implementing the method as defined above, or to a computer-readable recording medium comprising instructions which, when executed by a computer, cause the computer to implement the method as defined above.

The invention also relates to a signal of a data medium carrying the computer program product as defined above.

The invention also relates to a steering system comprising a computer, a steering device controlled by the computer, and means for detecting an environment, the detection means being linked to the computer, the computer being capable of implementing the calculation method as defined above.

The invention also relates to a motor vehicle, notably an autonomous vehicle, the vehicle comprising a computer, a steering device controlled by the computer, and means for detecting an environment of the vehicle, the detection means being linked to the computer, the computer being capable of implementing the calculation method as defined above.

DESCRIPTION OF THE FIGURES

These objects, characteristics and advantages of the present invention will be detailed in the following description of a specific embodiment, provided on a non-limiting basis, with reference to the attached figures, of which.

DETAILED DESCRIPTION

Figure 1:
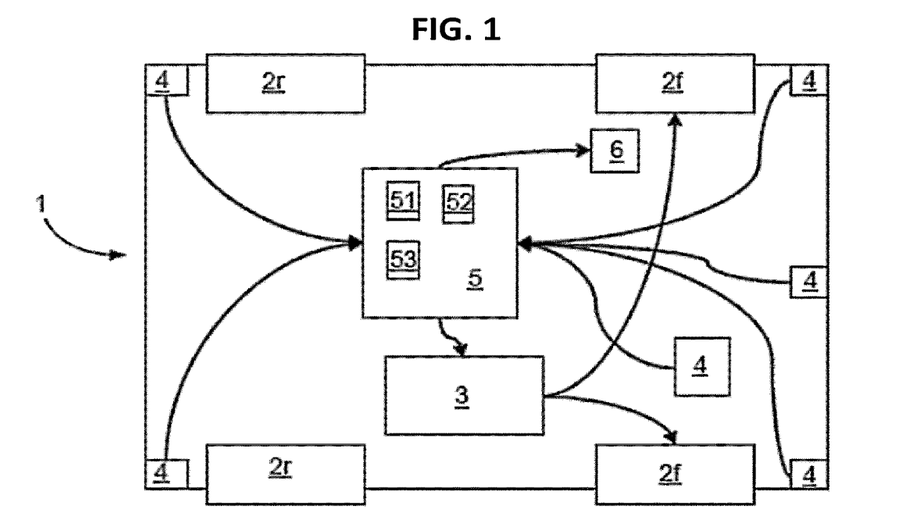
FIG. 1 is a schematic view of a motor vehicle according to one embodiment of the invention.

FIG. 1 shows schematically a motor vehicle 1 according to one embodiment of the invention. The vehicle 1 may be of any kind. Notably, it may be, for example, a private vehicle, a utility vehicle, a truck or a bus. The vehicle 1 comprises two front wheels $2f$, two rear wheels $2r$, and a steering device 3 connected to the two front wheels $2f$. The two front wheels $2f$ are steered wheels. Their orientation may be controlled by a steering system. The steering system comprises, notably, a steering device 3 means for detecting the environment of the vehicle. These detection means are formed by ADAS sensors 4. These sensors may be, for example, ultrasonic sensors, cameras or radars. They are capable of detecting objects or other vehicles positioned all around the vehicle 1. According to the embodiment presented here, the vehicle comprises six sensors 4, including five radar sensors placed at the four corners of the vehicle and substantially in the middle of the front of the vehicle, together with a camera capable of observing the road, notably at the front of the vehicle 1. In a variant, there could be a different number of sensors 4, and they could be arranged in other positions on the vehicle 1.

The steering system further comprises a computer 5 or electronic control unit. The computer 5 comprises, notably, a memory 51, a microprocessor 52 and an input/output interface 53. The computer is connected via its interface 53 to the sensors 4 so that it can receive the signals from these sensors at its input. The computer is also connected via its interface 53 to the steering device 3 so that it can send control commands to the steering device 3 for the orientation of the steered wheels $2f$. Finally, the vehicle 1 also comprises an instrument panel fitted with a screen 6. The screen 6 is connected to the computer 5 and can display information transmitted by the computer to a user of the vehicle 1. The memory 51 is a data recording medium on which is recorded a computer program comprising program code instructions for implementing a method for calculating a lateral position of the vehicle 1 according to one embodiment of the invention. The microprocessor 52 is capable of executing the code instructions recorded in the memory 51.

The vehicle 1 is an autonomous vehicle. Notably, the steering device 3, interacting with the computer 5 and the sensors 4, can autonomously control the orientation of the steered wheels $2f$ of the vehicle. Thus the vehicle can move without any passenger on board, or with passengers who do not directly control the vehicle's trajectory.

Figure 2:
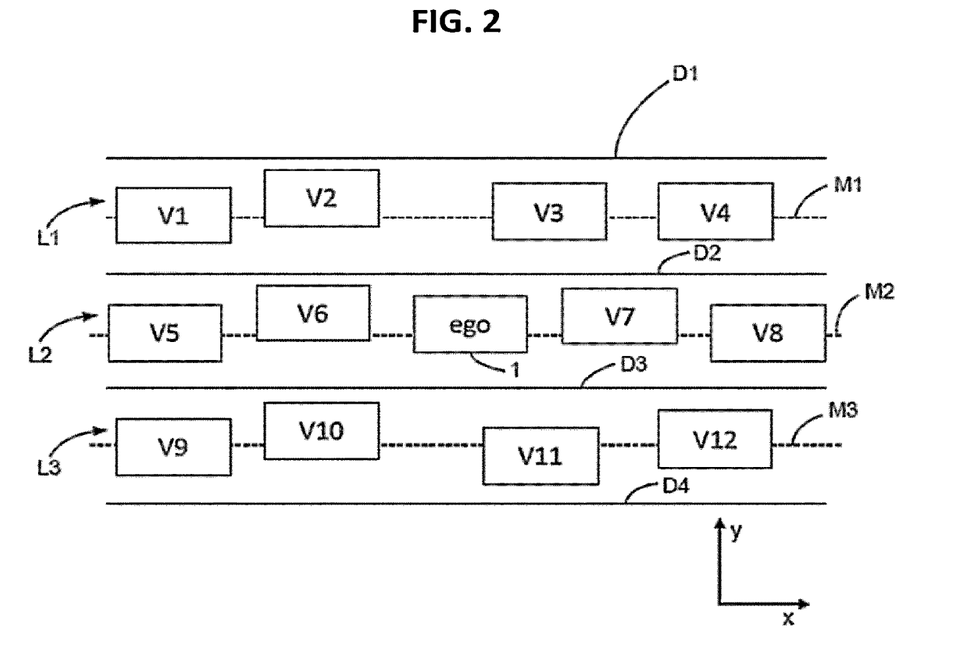
FIG. 2 is a schematic top view of a road having three traffic lanes on which the vehicle according to the invention, and surrounding vehicles, are traveling.

The vehicle 1 is capable of traveling on a road followed by other vehicles. Notably, FIG. 2 shows the vehicle 1, also called the ego vehicle, on a road comprising three traffic lanes L1, L2, L3. The term "ego" is a uniquely distinctive term for clearly differentiating vehicle 1 from the vehicles surrounding vehicle 1. The three traffic lanes are adjacent to each other. The three traffic lanes are identified and separated by demarcation lines D1, D2, D3, D4 which, for example, take the form of white or yellow lines and may be solid or broken. Such demarcation lines may be painted on the ground and may have a substantially constant width. Vehicles may change traffic lanes, or in other words may change their track and drive over the demarcation lines. The direction of movement of the three traffic lanes is indicated by a vector X. The ego vehicle is traveling on the central traffic lane L2. Other vehicles V1, V2, V3, V4, V5, V6, V7, V8, V9, V10, V11, V12 are also traveling on the traffic lanes L1, L2, L3. Vehicles V1, V2, V3 and V4 are traveling on the left-hand traffic lane L1. Vehicles V5, V6, V7 and V8 are traveling on the central traffic lane L2. Notably, vehicles V5 and V6 are positioned behind the ego vehicle, and vehicles V7 and V8 are positioned in front of the ego vehicle. In other words, vehicles V5 and V6 are vehicles following the ego vehicle, and vehicles V7 and V8 are vehicles preceding the ego vehicle. The preceding and following vehicles are therefore on the same traffic lane as the ego vehicle. Finally, vehicles V9, V10, V11 and V12 are traveling on the right-hand traffic lane L3. The vehicles V1 to V12 may form the set of vehicles that can be detected by the sensors 4 of the vehicle. Although they are represented by rectangles of equal size in FIG. 2, these vehicles may in fact be of any kind and of any size. They may advance at different speeds and their relative positions may change with time. Other vehicles traveling further ahead or behind on the same road may not be taken into consideration.

The lateral position, or offset, of a vehicle traveling on the road may be defined as the position of the vehicle on its traffic lane in the direction perpendicular to the direction in which the vehicle moves. With reference to FIG. 2, the vehicles are moving parallel to the vector X. The lateral position of a vehicle therefore designates the position of the vehicle along the vector Y, perpendicular to the vector X. A theoretical midline M1, M2, M3 may be defined for each traffic lane L1, L2, L3 as the line positioned equidistantly from the demarcation lines D1, D2, D3, D4 delimiting the traffic lane. The midline M1 is therefore positioned equidistantly from the demarcation lines D1 and D2. The midline M2 is positioned equidistantly from the demarcation lines D2 and D3. The midline M3 is positioned equidistantly from the demarcation lines D3 and D4. The midlines M1, M2, and M3 are theoretical lines, because they are not physically present on the traffic lanes, but are calculated as a function of the demarcation lines D1, D2, D3, D4. The lateral position of a vehicle on a traffic lane may be defined or calculated with reference to the midline of this traffic lane and according to the orientation of the vector Y. For example, the lateral position may be positive when the center of the vehicle concerned is positioned, or in other words shifted, to the left of the midline, and negative when the center of the vehicle concerned is shifted to the right of the midline.

Figure 3:
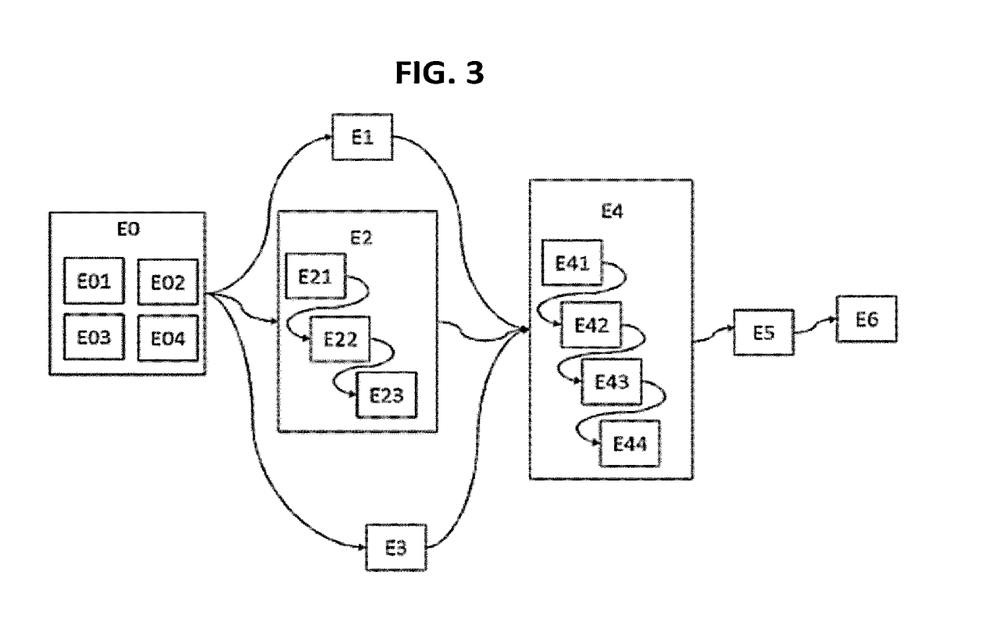
FIG. 3 is a synoptic diagram of a method for calculating a lateral position of the vehicle according to one embodiment of the invention.

FIG. 3 shows schematically a method for calculating a lateral position of an ego motor vehicle on a traffic lane according to one embodiment of the invention. The method comprises a sequence of steps E0, E1, E2, E3, E4, E5, E6, the aim of which is to calculate a lateral position Tego for the ego vehicle, and then to control the steering device 3 so that the ego vehicle adopts the lateral position Tego that has been calculated. The step E0 is a step of initializing the calculation method. The first step E1 is a step of calculating a first theoretical lateral position T1 of the ego vehicle. The first lateral position T1 is calculated as a function of the lateral position of vehicles preceding the ego vehicle and/or vehicles following the ego vehicle on the same traffic lane as the ego vehicle. With reference to the situation shown in FIG. 2, the first lateral position T1 is therefore calculated as a function of the lateral position of the following vehicles V5 and V6 and as a function of the lateral position of the preceding vehicles V7 and V8. The second step E2 is a step of calculating a second theoretical lateral position T2 of the ego vehicle. The second lateral position T2 is calculated as a function of the position of vehicles on traffic lanes adjacent to the traffic lane of the ego vehicle. With reference to the situation shown in FIG. 2, the second lateral position T2 is calculated as a function of the position of the vehicles present on lanes L1 and L3, that is to say vehicles V1, V2, V3, V4, V9, V10, V11 and V12. The third step E3 is a step of calculating a third theoretical lateral position T3 of the ego vehicle. The third lateral position T3 is calculated as a function of static obstacles (walls or barriers, for example) detected at the sides of said traffic lane. The fourth step E4 is a calculation step in which the lateral position of the ego vehicle Tego is calculated as a function of the first lateral position T1, the second lateral position T2 and the third lateral position T3. The fifth step E5 is a step of autonomous control of the steering device 3 of the ego vehicle, for the purpose of causing the ego vehicle to adopt the theoretical lateral position Tego calculated in the fourth step E4. The sixth step E6 is a step of displaying on the screen 6 of the ego vehicle a visual indication showing the position of the ego vehicle relative to the theoretical midline of the traffic lane of the ego vehicle, that is to say relative to the midline M2 in the situation shown in FIG. 2.

It should be noted that a lateral position is called "theoretical" by contrast with a real lateral position. A theoretical lateral position calculated at a given instant does not, therefore, necessarily match the real lateral position of the vehicle at this instant. Each of these steps E0 to E6 will now be explained in greater detail.

In the initialization step E0, certain checks and detections are performed before the calculation steps for calculating the lateral position Tego of the ego vehicle. The subsequent steps of the calculation method may be modified, interrupted or stopped if these conditions are not met and/or if no vehicle or obstacle is detected.

In a first substep E01 of the initialization step E0, a check is made as to whether the demarcation lines D2, D3 of the traffic lane L2 on which the ego vehicle is traveling are correctly detected by the sensor 4. If this is the case, it is possible to deduce the position of the midline M2 of the traffic lane L2 on which the ego vehicle is traveling. As explained above, the midline M2 may be calculated as the line positioned equidistantly from the demarcation lines D2 and D3. The midline M2 may also be calculated by a known algorithm or controller of the LCA (Lane Centering Assist) type. If the demarcation lines are non-existent or poorly visible, the method may be interrupted until the demarcation lines become clearly visible again.

In a second substep E02 of the initialization step E0, the curvature of the traffic lane L2 is calculated. If the radius of curvature of the traffic lane of the ego vehicle is less than or equal to a predefined threshold, the method may be interrupted until the radius of curvature of the traffic lane again exceeds the predefined threshold. For example, the radius of curvature of the midline M2 may be calculated. If the radius of curvature is below a predefined value, the method is interrupted until the radius of curvature returns to a higher level than the predefined value. This avoids having the trajectory of the vehicle modified in an excessively tight corner, which could destabilize the ego vehicle and/or result in biased calculations of the lateral position of the ego vehicle.

Other checks may also be made and may affect the progress of the calculation method. For example, the vehicle user may be able to manually activate or disable the method for calculating the lateral position. The calculation method could also be activated or disabled automatically on the basis of other operating parameters of the vehicle, such as the detection of a malfunction of the vehicle, notably a malfunction of an autonomous driving system, the detection of an activation of a vehicle trajectory control system of the ESP or ABS type, or the detection of any critical driving situation.

In a third substep E03, the environment of the vehicle is scanned with the sensors 4 in order to detect vehicles and/or objects surrounding the vehicle. If no vehicle and/or obstacle is detected, the method may be put on standby or interrupted until vehicles and/or obstacles are detected. When vehicles are detected in the environment of the ego vehicle, their position, their respective speed, and even their trajectory may be determined. The position of the vehicles may be determined relative to the position of the ego vehicle. For example, the position of the surrounding vehicles may be defined in a reference frame formed by the vectors X and Y, the reference being centered on the ego vehicle. It is possible, notably, to calculate the distance between the ego vehicle and each vehicle detected. The traffic lanes on which the vehicles are positioned are also determined. When vehicles are detected in the traffic lane of the ego vehicle (in front of or behind the ego vehicle), the lateral position of these vehicles may be calculated. Notably, the position of each of these vehicles relative to the midline M2 may be calculated. It is also possible to calculate the longitudinal distance between the ego vehicle and the vehicles positioned on the same traffic lane as the ego vehicle. The longitudinal distance between two vehicles on the same traffic lane may be defined as the distance between the two vehicles along the path of the midline, that is to say the curvilinear abscissa described by the road. The longitudinal distance between two vehicles is therefore greater than the absolute distance (as the crow flies) between two vehicles when the midline describes a curve.

In the initialization step E0, it is also possible to detect objects or static obstacles, that is to say those that are immobile relative to the road. Finally, at the end of the initialization step E0, a representation of the environment of the ego vehicle is obtained. According to a variant embodiment, it would be possible for the representation of the ego vehicle not to be obtained using the on-board sensors 4 of the ego vehicle, but to be transmitted by a wireless communication means to the ego vehicle. For example, the position and speed of each vehicle surrounding the ego vehicle could be obtained using an inter-vehicle communication protocol.

In a fourth substep E04 of the initialization step E0, a check may be made, in particular, for the presence of preceding and/or following vehicles in the traffic lane L2 of the ego vehicle. In particular, it is possible to check, firstly, that at least one first vehicle preceding the ego vehicle is detected in the traffic lane of the ego vehicle. Secondly, it is possible to check that at least one second vehicle preceding or following the ego vehicle is detected in the traffic lane of the ego vehicle. It is also possible to check that no direction indicator of the ego vehicle is activated, which would demonstrate an absence of intention to overtake on the part of the ego vehicle. If these three conditions are met, the first calculation step E1 may be executed. By default, the full calculation method could be interrupted until these conditions are again met. In a variant, the method could be continued without executing the first step of calculating E1, basing the calculation of the lateral position Tego solely on the second lateral position T2 and the third lateral position T3. According to another variant, the method could be continued if only one vehicle in front of the ego vehicle is detected, and if the speed of the ego vehicle is sufficiently low.

The substeps E01, E02, E03 and E04 may be executed independently of each other, in succession or in parallel. They may be repeated indefinitely, even during the execution of the subsequent steps E1 to E6. It may be noted that, when the method of calculating the lateral position is interrupted, stopped or modified, the ego vehicle may be positioned progressively in a conventional manner in the center of its traffic lane, for example so that the center of the ego vehicle is located on the midline M2.

The first calculation step E1 may comprise a substep of calculating a weighted average of the lateral positions of vehicles preceding and/or following on said traffic lane, weighting coefficients of each lateral position being a function of the longitudinal distance between the ego vehicle and the preceding and/or following vehicle concerned, and of the speed of the preceding and/or following vehicle concerned. In other words, the first lateral position T1 may be calculated using the following formula:

$$T1 = \frac{\sum_{i=1}^{i=N} a_{vi} T_{vi}}{\sum_{i=1}^{i=N} a_{vi}} \quad \text{[Math 1]}$$

where
N denotes the number of vehicles detected in the traffic lane of the ego vehicle,
i denotes an index of the vehicles present in the traffic lane of the ego vehicle,
Tvi denotes the lateral position of the vehicle i in the traffic lane of the ego vehicle,
avi denotes a weighting coefficient associated with the lateral position of the vehicle i.

Each weighting coefficient avi may be calculated according to the following formula:

$$a_{vi} = \min(f(D_{vi}), g(V_{vi})) \quad \text{[Math 2]}$$

where
Dvi denotes the longitudinal distance between the ego vehicle and the vehicle i,
Vvi denotes the speed of the vehicle i,
f and g denote maps, that is to say functions.

For example, the maps f and g may be defined so that the weighting coefficients satisfy the following inequality: av7>av6>av8>av5. For example, the maps f and g may also be defined so that the weighting coefficients avi increase when the vehicles i approach the ego vehicle and if their speeds are decreasing. The functions f and g may also be adjusted on the vehicle so as to refine the behavior of the ego vehicle. The weighting coefficients avi may also change in response to any systemic defects of sensors of the vehicle. When a vehicle i moves laterally into the lane of the ego vehicle with the aim of changing lanes, its weighting coefficient avi may be forced to 0. In other words, there is no alignment on the lateral position Tvi of the vehicle i while the latter is performing its lane change maneuver.

As explained in the description of the initialization substep E04, in order to execute the first calculation step E1, there should preferably be at least two vehicles in front of the ego vehicle or one vehicle in front of the ego vehicle and one vehicle behind the ego vehicle, or alternatively only one vehicle in front at low speed. The first lateral position T1 therefore reproduces an average of the lateral positions of the vehicles located in the same line or traffic lane as the ego vehicle. If the vehicles in the same traffic lane as the ego vehicle are all shifted to the left, the ego vehicle will also shift to the left. Similarly, if the vehicles in the same traffic lane as the ego vehicle are all shifted to the right, the ego vehicle will also shift to the right. By adopting this position, the ego vehicle merges into the traffic stream. A corridor for the passage of motorcycles, or even for emergency vehicles (such as ambulances, firefighting vehicles, police vehicles or the like) may be formed. The ego vehicle will not interfere with the passage of the motorcycles or emergency vehicles among the vehicles. Furthermore, the ego vehicle is positioned to a greater extent in the prolongation of the vehicle preceding it. It can therefore make better use of its suction. The driver of the vehicle preceding the ego vehicle can also have a better view of the road environment through his wing mirrors without having his vision masked by the ego vehicle.

Figure 4:
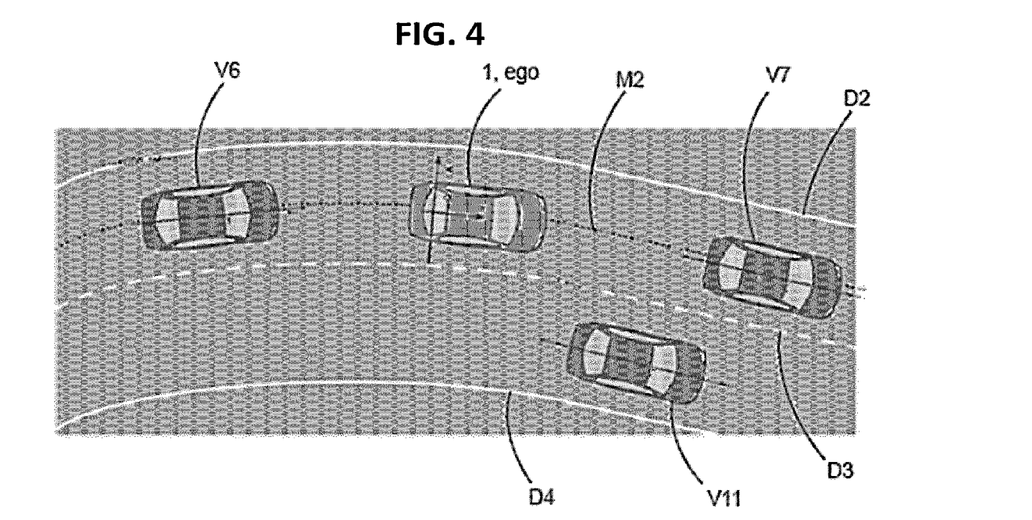
FIG. 4 is a schematic top view of a first example of a driving situation.
Figure 5:
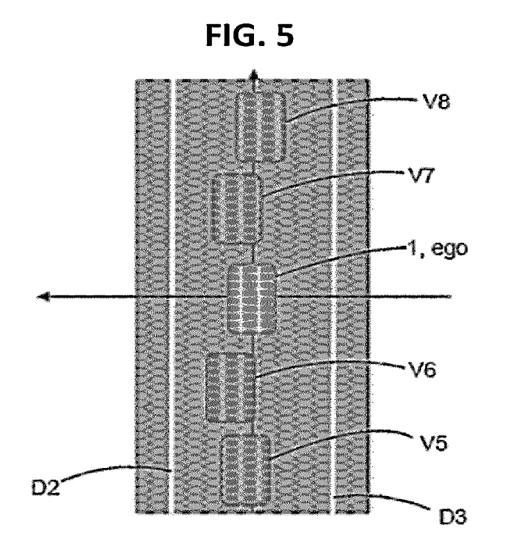
FIG. 5 is a schematic top view of a second example of a driving situation.

In the example illustrated in FIG. 4, the preceding vehicle V7 and the following vehicle V6 are both positioned more toward the inside of the bend, that is to say on the right of the midline M2. The ego vehicle copies its lateral positioning from that of the vehicles V6 and V7, and also positions itself on the inner side of the bend. In the example of FIG. 5, the vehicles V5, V6 and V7 are positioned on the left-hand side of the midline M2, while the vehicle V8 is positioned on the right-hand side. As a result of the calculation of a weighted average of the lateral positions of the vehicles V5 to V8, the ego vehicle following the first lateral position T1 would also position itself on the left-hand side of the midline M2.

Figure 6:
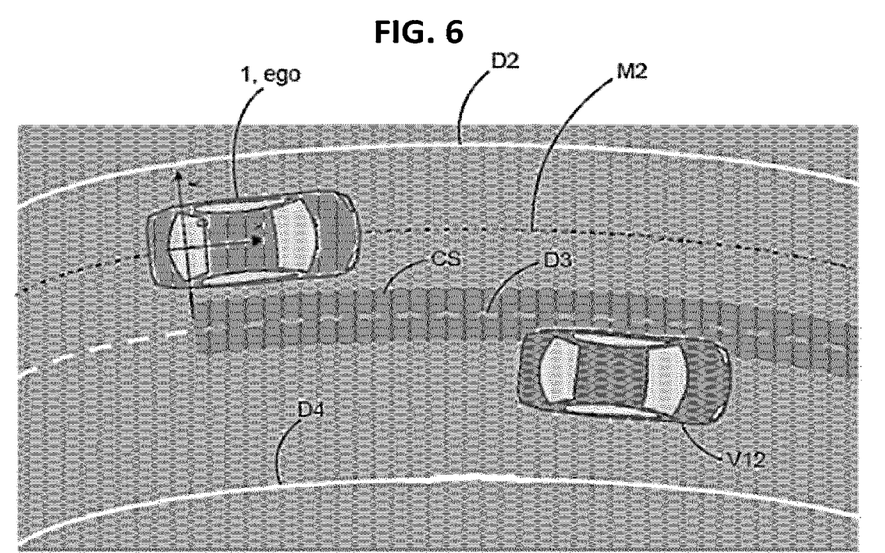
FIG. 6 is a schematic top view of a third example of a driving situation.
Figure 7:
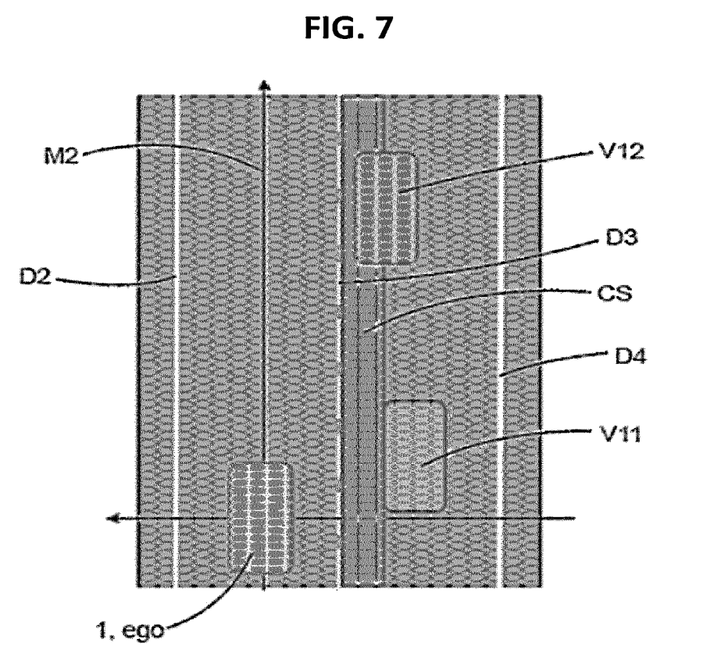
FIG. 7 is a schematic top view of a fourth example of a driving situation.

The second calculation step E2 is shown schematically in FIGS. 6 and 7. The second step E2 enables the lateral position of the ego vehicle to be adapted as a function of the presence of interfering vehicles on the traffic lanes adjacent to the traffic lane of the ego vehicle. Vehicles may be interfering, notably, when they are very wide, like trucks or buses for example, or when they are simply badly positioned in their own traffic lanes.

The second step E2 comprises a first substep E21 of calculating a theoretical safety margin CS, or theoretical safety corridor, on either side of a demarcation line extending between the traffic lane of the ego vehicle and a traffic lane adjacent to the traffic lane of the ego vehicle. Notably, in this step it is also possible to calculate two safety corridors on either side of the two demarcation lines D2, D3 delimiting the traffic lane of the ego vehicle on the right and on the left. The safety corridor is a virtual surface that may be defined as extending across from the traffic lane of the ego vehicle into an adjacent traffic lane. The center of the safety corridor may be placed on the demarcation line, so that the safety corridor extends as far into the traffic lane of the ego vehicle as it does into the adjacent traffic lane. Advantageously, the width of the safety corridor may be parameterized. The greater the width, the greater is the probability of detecting the presence of a vehicle in the safety corridor. When the safety corridors have been defined, the sensors 4 are used to search for the potential presence of a vehicle in the safety corridor.

In a second substep E22, the presence of a vehicle in the safety corridor is detected. For example, in the situation shown in FIG. 6, the presence of the vehicle V12 in the safety corridor CS is detected. The distance between the ego vehicle and the vehicle detected in the safety corridor, and the speed of the vehicle detected in the safety corridor, can then be calculated.

In a third substep E23, the second lateral position is calculated as a function of the distance between the ego vehicle and the vehicle detected in the safety corridor, and as a function of the speed of the vehicle detected in said safety corridor. Notably, the second lateral position T2 may be inversely proportional to a time to impact TTC with the detected vehicle, and proportional to a distance of the area penetrated by the vehicle detected in the safety corridor CS. The time to impact TTC, which may also be referred to as the "time to reach", may be defined as the period at the end of which the ego vehicle could reach the vehicle present in the safety corridor if their trajectories should meet and if no correction of these trajectories were carried out. The second lateral position T2

For example, the second lateral position T2 may be calculated using the following formula:

$$T2 = \min_{j=1 \grave{a} M}(L_{Vj} \cdot G_{Vj}) + \min_{k=1 \grave{a} P}(L_{Vk} \cdot G_{Vk}) \quad \text{[Math 3]}$$

where
 M denotes the number of vehicles detected in the traffic lane adjacent to the traffic lane of the ego vehicle,
 j denotes an index of the vehicles present in the adjacent traffic lane on the left,
 P denotes the number of vehicles detected in the adjacent traffic lane on the right of the traffic lane of the ego vehicle,
 k denotes an index of the vehicles present in the adjacent traffic lane on the right,
 Lvj and Lvk denote the penetration distance of vehicles j and k respectively,
 Gvj and Gvk are gains associated with vehicles j and k respectively, the gain being a map which is a function of the time to impact TTC and/or a function of the speed of vehicles j and k respectively.

Since the gains depend on the time to impact TTC, the lateral position T2 may increase as the ego vehicle approaches a vehicle concerned. The shorter the time to impact TTC, the closer the gain associated with the vehicle concerned may be to 1, and the closer the second lateral position T2 will be to the distance of penetration into the safety corridor of the vehicle concerned.

The second lateral position T2 can be calculated if, and only if, there are vehicles for which the time to impact TTC is below a predefined threshold. Thus any vehicles whose time to impact TTC is above this threshold may be ignored. It is also possible for the calculation of the second lateral position T2 to take into account only those vehicles that are not currently executing a maneuver of joining the lane of the ego vehicle. Such a maneuver may be detected, for example, if the vehicle concerned has activated a luminous indicator such as a direction indicator. Algorithms for detecting a lane-changing maneuver of a vehicle without the activation of its direction indicator may also be used.

With reference to the situation shown by way of example in FIG. 7, the presence of the vehicle V12 is detected in the safety corridor CS to the right of the traffic lane of the ego vehicle. It is assumed that no vehicle is detected in the traffic lane on the left of the traffic lane of the ego vehicle, or even that the road does not have a traffic lane on the left of the traffic lane of the ego vehicle. According to the calculation explained above, the ego vehicle following the second lateral position T2 would shift to the left-hand side of the midline M2 in order to maintain a sufficient lateral safety distance from the vehicle V12. However, in a situation where two interfering vehicles were detected in the safety corridors on the right and on the left of the traffic lane of the ego vehicle, the ego vehicle could center itself so as to balance the safety distances from the interfering vehicles on the right and left.

The situations shown in FIGS. 6 and 7 could occur if the ego vehicle overtakes vehicles V11 and V12 on the left. A similar calculation could cause the ego vehicle to be shifted to the right if the ego vehicle had to be overtaken on the left by a vehicle detected in a left-hand safety corridor. The calculation method could also be transposed for use with left-hand drive and overtaking on the right.

In the third calculation step E3, the third lateral position T3 of the ego vehicle is calculated as a function of the static objects surrounding the ego vehicle. A margin is defined around the lines adjacent to the ego vehicle, in the same way as for the second calculation step E2. The third lateral position T3 is proportional to the distance of penetration of the static object into the safety area around a demarcation line adjacent to the ego vehicle. This calculation step makes it possible, for example, to reproduce the behavior of a human, who would tend to shift his vehicle within the traffic lane when a safety barrier is near a demarcation line adjacent to the ego vehicle.

In the fourth calculation step E4, the lateral position of the ego vehicle Tego is calculated as a function of the first lateral position T1, the second lateral position T2 and the third lateral position T3. More precisely, the lateral position of the ego vehicle Tego may be calculated with a weighted average in the following form:

$$Tego = \frac{a1.T1 + a2.T2 + a3.T3}{a1 + a2 + a3} \quad \text{[Math 4]}$$

where
- a1 denotes a weighting coefficient associated with the first lateral position T1,
- a2 denotes a weighting coefficient associated with the second lateral position T2, and
- a3 denotes a weighting coefficient associated with the third lateral position T3.

Advantageously, the weighting coefficients a1, a2 and a3 may be adapted on the basis of the traffic conditions of the ego vehicle. In a first substep E41 of the calculation step E4, the traffic conditions of the ego vehicle may therefore be detected. Notably, the density of road traffic on the road taken by the ego vehicle may be detected. This detection may, for example, be based on an index obtained by counting a number of vehicles present in a given perimeter around the ego vehicle. The road traffic density may also be estimated by analyzing both the longitudinal and the lateral positions of the vehicles surrounding the ego vehicle.

In a second substep E42 of the calculation step E4, the weighting coefficients a1, a2 and a3 may be calculated as a function of the detected traffic conditions of the ego vehicle, notably as a function of the road traffic density. For example, it may be specified that a1=a2=a3=⅓ if the same weight is to be given to each of the three lateral positions T1, T2, T3 calculated previously. These parameters may, for example, be used when the road traffic density is normal or usual. When a congestion situation is detected, for example when the number of vehicles in a given perimeter around the ego vehicle exceeds a certain threshold, the weighting coefficients may be specified in such a way that a1=0.2, a2=0.8 and a3=0. Thus more weight is given to the second lateral position T2 that was calculated previously, and the third calculated lateral position T3 is disregarded. This makes the positioning of the ego vehicle on its traffic lane closer to the position obtained with human control of the vehicle. A weighting coefficient of 0 means that the calculation of the corresponding lateral distance can be disregarded. For example, if the conditions found during the initialization substep E04 are not present, the coefficient a1 can be given a zero value. The value of these coefficients a1, a2, a3 may be reassessed regularly on the basis of changes in the traffic conditions.

In order to obtain a calculation of the lateral position that ensures the safety of drivers in all circumstances, the calculated lateral position may be filtered by the weighted average described above. Notably, in a third substep E43, the maximum difference between the theoretical lateral position of the ego vehicle and a theoretical midline of the traffic lane of the ego vehicle may be limited; in other words, it may be made subject to a ceiling. This ceiling may depend on the measured lane width. This prevents the vehicle from shifting too far to one or other side of the traffic lane. Notably, the ego vehicle can be prevented from moving into the safety corridors defined previously. In a fourth substep E44, the temporal variation of the theoretical lateral position of the ego vehicle may also be limited. This avoids excessively abrupt variations of lateral position which could destabilize the ego vehicle. Finally, at the end of the fourth step E4, we obtain an ideal lateral position Tego, which may be used for controlling the steering device 3.

In a fifth step E5, the steering device of the ego vehicle is controlled so as to cause the vehicle to adopt the lateral position Tego calculated in the fourth step. This control step is executed autonomously, that is to say without the intervention of a user of the vehicle. The difference between the real measured lateral position of the ego vehicle and the calculated lateral position Tego leads to the calculation of a set angle of the steered wheels, and consequently a control command for the steered wheels. The steered wheels of the vehicle are therefore turned by the steering device 3 so that the ego vehicle adopts the lateral position Tego. Steps E1 to E5 may then be repeated at a specified frequency in order to adjust the lateral position of the ego vehicle in real time.

In a sixth step E6, a visual indication, showing the position of the ego vehicle relative to the midline of the traffic lane of the ego vehicle, may be displayed on the screen 6 of the ego vehicle. The visual indication may, for example, consist of an arrow directed toward the left or to the right, depending on whether the ego vehicle has shifted to the left or the right with respect to the midline. Thus the users of the ego vehicle are not surprised by the non-centered positioning of the vehicle. They understand that the off-center position of the ego vehicle is intentional.

Because of the invention, a lateral position of the vehicle is calculated on the basis of the preliminary calculation of three distinct lateral positions. Each of the three lateral positions T1, T2, T3 is calculated as a function of a part of the environment of the ego vehicle. The final result is a lateral position of the vehicle in its traffic lane which is more natural. The vehicle merges more satisfactorily into the traffic stream. It maintains suitable lateral safety distances, while allowing motorcycles or emergency vehicles to overtake the lines of cars.

The invention claimed is:

1. A method of calculating a lateral position of an ego motor vehicle on a traffic lane, the method comprising:
    calculating a first lateral position of the ego vehicle on said traffic lane based on a respective lateral position, on said traffic lane, of each of at least one first vehicle preceding the ego vehicle and/or at least one second vehicle following the ego vehicle,
    calculating a second lateral position of the ego vehicle on said traffic lane based on a respective position each of at least one third vehicle on traffic lanes adjacent to said traffic lane,
    calculating a third lateral position of the ego vehicle on said traffic lane based on each of at least one static obstacle detected on sides of said traffic lane,
    calculating the lateral position of the ego vehicle based on the calculated first lateral position, the calculated second lateral position, and the calculated third lateral position; and
    autonomously controlling a steering device of the ego vehicle to cause the ego vehicle to adopt the calculated lateral position.

2. The calculation method as claimed in claim 1, wherein the calculating the first lateral position further comprises a calculating a weighted average of the respective lateral positions of the at least one first vehicle and/or the at least one second vehicle, weighting coefficients of each lateral position being a function of (1) a respective longitudinal distance between the ego vehicle and the at least one first vehicle and/or the at least one second vehicle, and (2) a respective speed of the at least one first vehicle and/or the at least one second vehicle.

3. The calculation method as claimed in claim 1, wherein the calculating the second lateral position further comprises:
   calculating a safety corridor on either side of a demarcation line, the demarcation line extending between the traffic lane of the ego vehicle and a traffic lane adjacent to the traffic lane of the ego vehicle,
   detecting a presence of a particular vehicle in the safety corridor,
   calculating the second lateral position as a function of (1) a distance between the ego vehicle and the particular vehicle detected in said safety corridor, and (2) a speed of the particular vehicle detected in said safety corridor.

4. The calculation method as claimed in claim 1, further comprising repeating each of the calculating step when determining that a first condition is met, the first condition being met:
   when demarcation lines of the traffic lane of the ego vehicle are detected by the ego vehicle, and
   when a curvature of the traffic lane of the ego vehicle is less than or equal to a predefined threshold.

5. The calculation method as claimed in claim 1, further comprising repeating each of the calculating step when determining that a second condition is met, the second condition being met:
   when the at least one first vehicle preceding the ego vehicle is detected,
   when the at least one second vehicle following the ego vehicle is detected or at least two first vehicles are detected, and
   when no direction indicator on the ego vehicle is activated.

6. The calculation method as claimed in claim 1, wherein the calculating the lateral position further comprises:
   detecting traffic conditions of the ego vehicle,
   calculating a first weighting coefficient of the first lateral position, a second weighting coefficient of the second lateral position, and a third weighting coefficient of the third lateral position, based the detected traffic conditions of the ego vehicle; and
   calculating the lateral position as a weighted average of the first, second, and third lateral positions using the first, second, and third weighting coefficients.

7. The calculation method as claimed in claim 1, wherein the calculating the lateral position further comprises:
   limiting a difference between the lateral position of the ego vehicle and a midline of the traffic lane of the ego vehicle, and/or
   limiting a temporal variation of the lateral position of the ego vehicle.

8. The calculation method as claimed in claim 1, further comprising:
   displaying, on a screen of the ego vehicle, a visual indication showing a current position of the ego vehicle relative to a midline of the traffic lane of the ego vehicle.

9. A non-transitory computer-readable data recording medium on which is recorded a computer program that, when executed by a computer, causes the computer to execute the method of calculating of claim 1.

10. An ego motor vehicle, comprising:
   a computer,
   a steering device controlled by the computer, and
   a sensor configured to detect an environment of the motor vehicle, the sensor being linked to the computer, the computer being configured to;
   calculate a first lateral position of the ego vehicle on said traffic lane based on a respective lateral position, on said traffic lane, of each of at least one first vehicle preceding the ego vehicle and/or at least one second vehicle following the ego vehicle,
   calculate a second lateral position of the ego vehicle on said traffic lane based on a respective position of each of at least one third vehicle on traffic lanes adjacent to said traffic lane,
   calculate a third lateral position of the ego vehicle on said traffic lane based on each of at least one static obstacle detected on sides of said traffic lane,
   calculate the lateral position of the ego vehicle based on the calculated first lateral position, the calculated second lateral position, and the calculated third lateral position; and
   autonomously control a steering device of the ego vehicle to cause the ego vehicle to adopt the calculated lateral position.

11. The motor vehicle as claimed in claim 10, wherein the ego motor vehicle is an autonomous vehicle.

* * * * *